Sept. 13, 1966 G. B. THOMPSON 3,272,919

TELEVISION FADER AMPLIFIER

Filed Nov. 15, 1963 2 Sheets-Sheet 1

3,272,919

TELEVISION FADER AMPLIFIER

Gordon B. Thompson, Ottawa, Ontario, Canada, assignor to Northern Electric Company Limited, Montreal, Quebec, Canada Filed Nov. 15, 1963, Ser. No. 324,119
8 Claims. (Cl. 178—7.1)

This invention relates to improvements in circuits for use in a television transmission system for the fading and/or crossmixing (superimposition, with or without changes of signal strength) of one or more video signals.

Such circuits are commonly referred to as fader amplifiers, since their prime utility is the fading in or fading out (dissolving) of a single video signal, or the simultaneous fading in of one signal and fading out of another. Although, as indicated, such circuits can also be used for direct superimposition of video signals, without fading, they will be referred to in this specification as "fader amplifiers." Moreover, "amplifier" is used in the sense of a circuit for modifying the amplitude of a signal, not necessarily to increase it.

Conventional fader amplifiers are incapable of adequately handling television signals containing non-picture information, that is sync pulses, set-up and colour burst, in other words a composite video signal as it is transmitted to the receivers. Since the non-picture components of the outgoing composite signal must be maintained at a substantially constant amplitude, regardless of any change in the amplitude of the picture signal with fading, and since conventional fader amplifiers are constructed to modify the gain of all the signal components fed to them, they cannot be used to handle composite signals.

Since the terminology employed in the past in relation to composite and non-composite signals has not always been entirely consistent, it is proposed at this point to define these terms as used in this specification, together with a further term "semi-composite."

By the term "composite signal," reference is made to a television signal which includes the picture information, the set-up and the sync, and, if the signal is in colour, the colour burst.

By the term "semi-composite signal," reference is made to a television signal including the picture information and the set-up only. Thus, reference to an "at least semi-composite signal" calls necessarily for the picture information and the set-up, and optionally for the sync and colour burst.

By the term "non-composite signal," reference is made to a signal containing the picture information only.

Since it will be convenient to refer to the accompanying drawings in connection with the general introduction to this invention, the figures of the drawings will now be listed and described.

Figure 1:
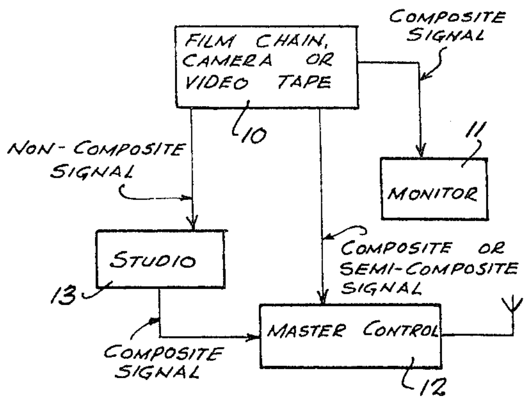
FIGURE 1 is a block diagram illustrating a problem presented by conventional types of fader amplifiers.

The relevant portion of a typical conventional television transmission system is shown in FIGURE 1. The block 10 represents apparatus comprising either a film chain, a camera, or a video tape reproducing machine. Signals originating in apparatus 10 will be sent to a local monitor 11 by which the operator of the apparatus 10 checks its operation, to a master control 12 and to a studio 13. The monitor 11 prefers a composite signal. The master control 12 can accept either a composite or a semi-composite signal, but not a non-composite signal. On the other hand, the studio 13 requires a non-composite signal. The reason why the studio 13 must receive only a non-composite signal is that it will include at least one fader amplifier, and as already explained, fader amplifiers as presently available only function properly with non-composite signals.

Thus, past practice can be summarised in another way by saying that all switching facilities of the system have been divided into two sections, one section dealing with non-composite signals and the other section dealing with composite or semi-composite signals. Fader amplifiers have been usable only in the first section, and this has placed an unfortunate limitation on their utility, as well as complicating the overall system. It has complicated the system because the apparatus 10 has been called upon to produce at least two different types of signal (non-composite, and either composite or semi-composite or both). It has been capable of this facility, but only at the expense of complication. It would be advantageous if the requirement for different types of output signal from apparatus of the type represented by the block 10 could be avoided, that is, if all circuits receiving signals from the apparatus 10 could accept a single uniform type of signal, conveniently a composite signal. If anything but a composite signal were chosen it would be necessary to provide a separate supply of synchronising information to apparatus such as the monitor 11.

The object of the present invention is to overcome these disadvantages by providing a fader amplifier which can accept composite signals, as well as semi-composite and non-composite ones. With such facility all the outputs from apparatus 10 can take the form of composite signals. On the other hand, the injection of semi-composite or non-composite signals into the system from some other source is in no way precluded, since the fader amplifier employed therein is sufficiently versatile to handle all sorts of signal.

This object is achieved according to the invention by a television fader amplifier comprising input means for a composite (or semi-composite) video signal, means for subtracting the set-up from such signal, means for amplifying the remainder signal after said subtraction, means for clamping the amplified remainder signal to a reference voltage during blanking intervals to produce a clamped non-composite signal of amplitude determined by said amplifying means, and means for combining said non-composite signal with blanking and sync pulses of known amplitude to generate a composite output signal.

Figure 2:
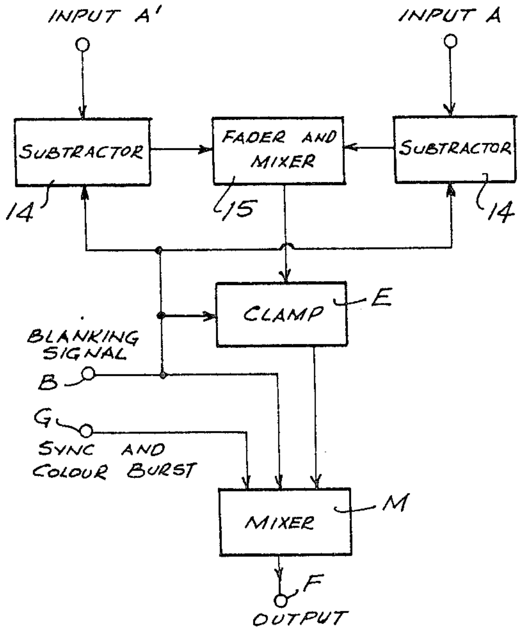
FIGURE 2 is a block diagram illustrating the present invention in broad terms.

Such a circuit is illustrated broadly in FIGURE 2. Since acceptance of fully composite signals (as distinct from mere semi-composite signals) is the more fundamental requirement, it will be assumed in the example that two composite video signals are received at inputs A and A′ respectively. Each of these signals is fed to a respective subtractor circuit 14 in which the set-up is removed. For this purpose subtractor circuits 14 receive a blanking signal from input B. The outputs from the subtractor circuits 14 are modified in amplitude and mixed in a fader and mixer 15 from whence they pass to a clamp E where sync and any colour burst information are removed. The clamp E also receives the blanking signal. Finally, the output from clamp E is re-combined in an output mixer M with the blanking signal and sync and colour burst received at terminal G, and fed to the output F.

Figure 4:
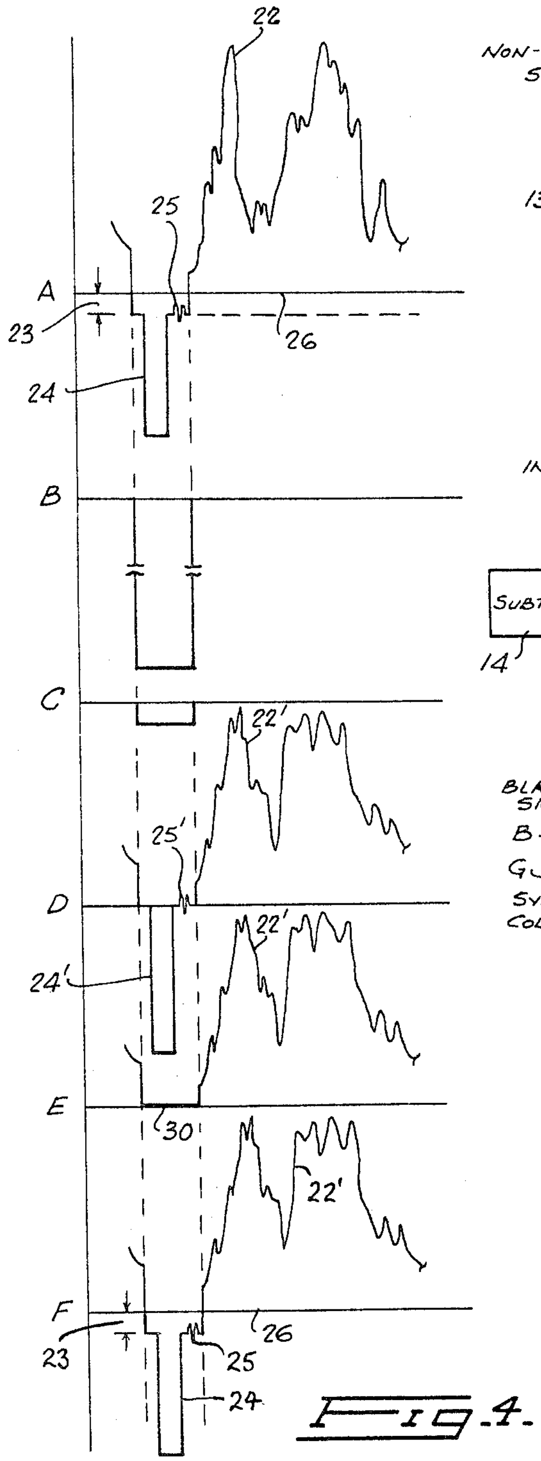
FIGURE 4 is a wave-form diagram.
Figures 3, 5:
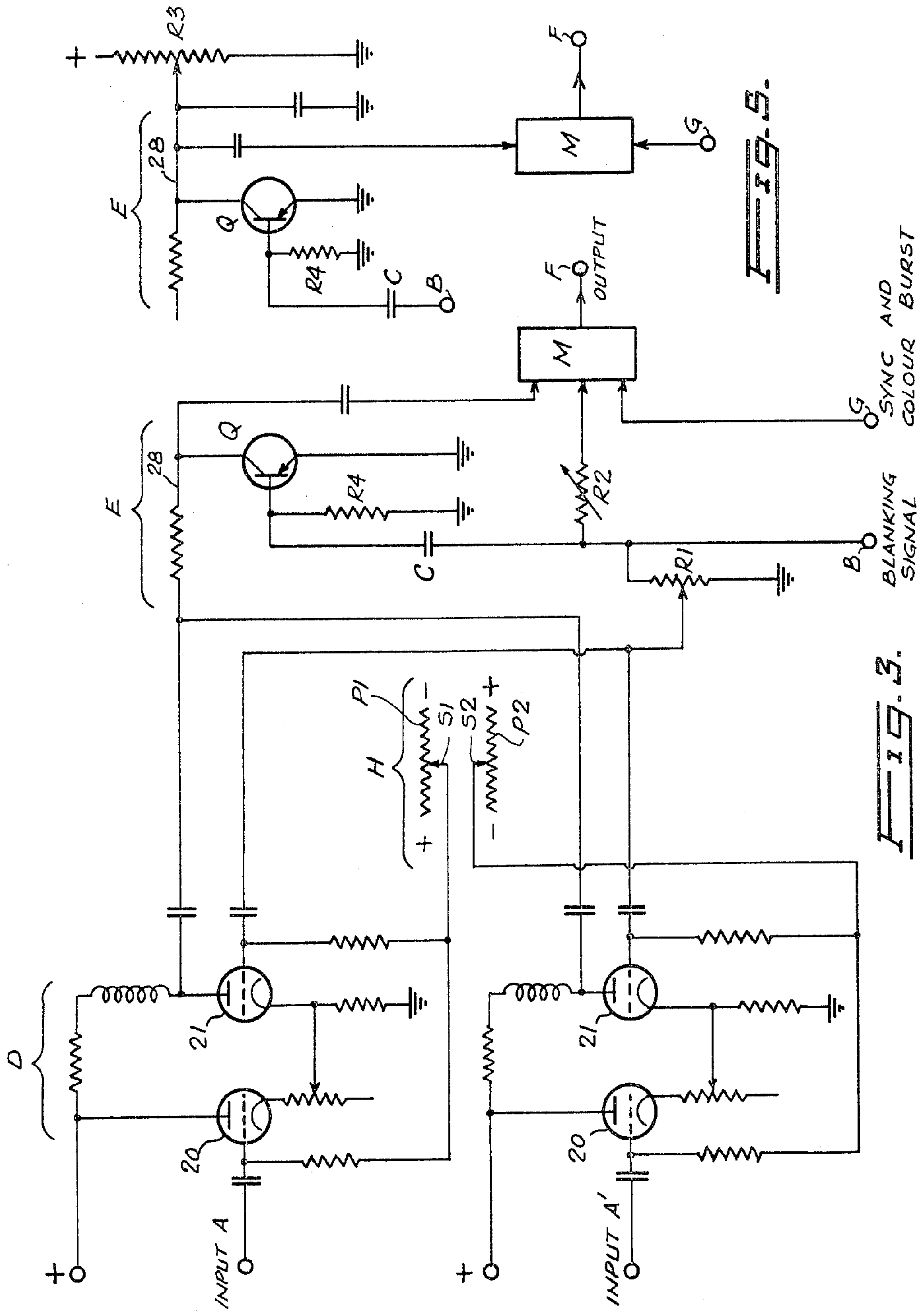
FIGURE 3 is a more detailed circuit according to the invention.
FIGURE 5 is a fragment of FIGURE 3 showing a modification.

A specific example of a circuit according to FIGURE 2 is illustrated in FIGURE 3. Here the subtractor and fader and mixer functions are all combined together in two pairs of cathode-coupled triodes 20 and 21 connected as a differential amplifier D. However, if preferred, these functions can be carried out by separate circuits. Reference should now also be made to FIG- URE 4 which illustrates the wave forms with which the circuit is concerned. FIGURE 4 shows a typical composite video signal applied at input A (or A') which consists of picture information 22; setup, as represented by the distance 23; sync pulses 24; and colour burst 25. The horizontal axis 26 represents the reference black level. FIGURE 4B illustrates the blanking pulses received at input B, an attenuated version of which is obtained from a variable resistor R1 and applied to the grids of the tubes 21. This attenuated signal is shown in FIGURE 4C, and it will be noted that its amplitude is equal to the amplitude of the set-up 23. As a result, the set-up is subtracted and does not form part of the remainder signal which appears at the output of the differential amplifier D, which output is illustrated in FIGURE 4D.

Other functions are performed in the differential amplifier D, by virtue of the fader controls H. These controls are shown as typical in form, consisting of a pair of potential dividers P1 and P2 with a respective pair of sliders S1 and S2 movable in side-by-side paths, so as to be conveniently manually movable either together or independently. Assuming that the circuit is being used to fade in the signal from input A while fading out the signal from input A', the fader controls H would be moved synchronously from right to left as shown so as gradually to bias out the portion of the differential amplifier D receiving input A', while increasing the amplification given to the signal from input A. The picture portion 22' of the composite signal shown in FIGURE 4D is assumed to be a mixture of the two input picture signals produced at some intermediate state in this fade-in, fade-out process. It will be noted that the sync 24' and colour burst 25' remain, although control over the amplitude of these portions of the signal has now been lost. It is not practicable to subtract the sync information at this stage, since its amplitude is unknown. It may be larger or smaller than normal, depending on the positions of sliders S1 and S2. In FIGURE 4D, the sync pulse 24' has been shown larger than usual.

The output from the differential amplifier D is fed to a clamp E comprising a PNP transistor Q the collector of which is connected to the signal path 28, the emitter of which is grounded, and the base of which receives blanking signals B through a capacitor C. During the blanking interval, the base of the transistor Q is driven in a negative direction, causing the capacitor C to charge, and driving transistor Q deeply into conduction, whereupon its emitter collector circuit acts as a short circuit across the signal path 28, or, if the collector should be positive, causes a heavy current flow in the forward direction from the collector to the base. The output from the clamp E (shown in FIGURE 4E at 30) is thus zero volts during the blanking interval. After each blanking interval a charge remains on the capacitor C which slowly leaks away through resistor R4. This charge biases the base of transistor Q positive relative to ground, causing the transistor to present a high impedance to the signal path 28 so that the picture signal 22' is transmitted substantially unchanged to an output mixer amplifier M of conventional design where set-up and sync (and, if appropriate, colour burst) are reinstated in the composite signal to emerge at output F in the form shown in FIGURE 4F. The set-up is obtained from the blanking pulses received at B, controlled in amplitude by a variable resistor R2, and the sync and colour burst are supplied at the required amplitude at input G. The reinstatement of the composite signal with assured orientation to the reference black level 26 follows from the fact that the portion 30 of the previous wave form was positively clamped at ground potential and that a predetermined amount of set-up has since been added. The clamp E serves to remove any low frequency disturbance put in by the amplifier D, as well as any colour burst or synchronizing signals that may have been present in the input signal.

An alternative and preferred method of adding the set-up to the outgoing signal is illustrated in FIGURE 5. Resistor R2 and the connection from terminal B to the amplifier M are dispensed with, the set-up being added in the clamp E by a resistor R3 which provides a small fixed positive voltage equal in magnitude and opposite in sign to the set-up. Thus, during a blanking interval, the transistor Q removes not only the high frequency signals (sync and colour burst), but also the small fixed voltage. After termination of the blanking interval, the level of the video signal is raised above the clamped level by the amount of this fixed voltage, which is equivalent to adding a negative set-up of equal value during the blanking intervals.

The blanking pulses received at B are, of course, synchronised with the blanking intervals of the input video signals; and likewise the sync and colour burst information is similarly synchronised. Such synchronisation will be achieved in the standard manner from a conventional synchronising signal generator (not shown) forming part of the overall transmission system and being common to all the signals with which the present description is concerned.

The fader amplifier of the present invention may thus be characterised as essentially a time-oriented system. Due to the difficulties inherent in accurately controlling the amplitudes of output signals from fader amplifiers, especially when two video signals are being combined, the present system has the advantage that it avoids the placing of any reliance on amplitude. Instead, it depends on the far more reliable element of time, namely the timing of the blanking intervals. Timing is a more reliable basis, because in all parts of the circuit it stems from a common source, the synchronising generator.

The specific circuit illustrated and described herein is merely an example of the performance of the invention, the broad scope of which is defined in the appended claims.

I claim:

1. A television fader amplifier comprising input means for an at least semi-composite video signal, means for subtracting set-up from said signal, means for amplifying the remainder signal after said subtraction, means for clamping the amplified remainder signal to a reference voltage during blanking intervals to produce a clamped non-composite signal of selected amplitude, and means for combining said non-composite signal with set-up and sync pulses of known amplitude to generate a composite output signal.

2. A television fader amplifier comprising (a) input means for an at least semi-composite video signal, (b) means for generating attenuated blanking pulses synchronised with the blanking intervals of said signal and substantially equal in magnitude to the set-up of said signal, (c) means for mixing said pulses and said signal to subtract the set-up from said signal and produce a remainder signal, (d) means for amplifying said remainder signal, including means for modifying the gain of said amplifying means, (e) clamping means sensitive to pulses received during said blanking intervals for clamping the amplified remainder signal to a reference voltage during the blanking intervals to remove all pulses including sync pulses occurring during the blanking intervals to produce a clamped non-composite signal of selected amplitude, (f) and means for combining said non-composite signal with set-up and sync pulses of known amplitude to generate a composite output signal.

3. A fader amplifier according to claim 1, wherein said clamping means comprises a transistor, means connecting the emitter-collector circuit of said transistor between said remainder signal and said reference voltage, means biasing the base of said transistor to render the same substantially non-conducting, and means operative during the blanking intervals to overcome said bias and render the transistor conducting.

4. A fader amplifier according to claim 3, wherein said means for combining said non-composite signal with set-up pulses comprises a voltage source equal in magnitude and opposite in sign to the set-up pulses and means connecting said source to said remainder signal.

5. A television fader amplifier comprising (a) a plurality of input means respectively for receiving at least semi-composite video signals synchronised with each other, (b) means for generating attenuated blanking pulses synchronised with the blanking pulses of said signals and substantially equal in magnitude to the set-up of said signals.

(c) means for mixing said pulses with each of said signals to subtract the set-up therefrom and produce corresponding remainder signals, (d) means for amplifying and mixing said remainder signals to produce a single combined remainder signal, including means for modifying the proportions of said remainder signals appearing in said combined remainder signal, (e) clamping means sensitive to pulses received during said blanking intervals for clamping the combined remainder signal to a reference voltage during the blanking intervals to remove all pulses including sync pulses occurring during the blanking intervals to produce a clamped non-composite signal of selected amplitude, (f) and means for combining said non-composite signal with set-up and sync pulses of known amplitude to generate a composite output signal.

6. A fader amplifier according to claim 5, wherein said means (c) and (d) together comprise a differential amplifier having a plurality of pairs of cathode-coupled triodes, means connecting said triodes to receive a signal on the grid of one triode of each pair from a respective said input means and to receive said attenuated blanking pulses on the grid of the other triode of each pair, and fader control means for modifying the gain of each pair of triodes independently of the gain of each other pair of said triodes.

7. A fader amplifier according to claim 5 wherein said clamping means comprises a transistor, means connecting the emitter-collector circuit of said transistor between said combined remainder signal and said reference voltage, means biasing the base of said transistor to render the same substantially non-conducting, and means operative during the blanking intervals to overcome said bias and render the transistor conducting.

8. A fader amplifier according to claim 7, wherein said means for combining said non-composite signal with set-up pulses comprises a voltage source equal in magnitude and opposite in sign to the set-up pulses and means connecting said source to said combined remainder signal.

References Cited by the Examiner

UNITED STATES PATENTS 2,412,279 12/1946 Miller.

DAVID G. REDINBAUGH, *Primary Examiner.*

R. L. RICHARDSON, *Assistant Examiner.*